Figure 1:
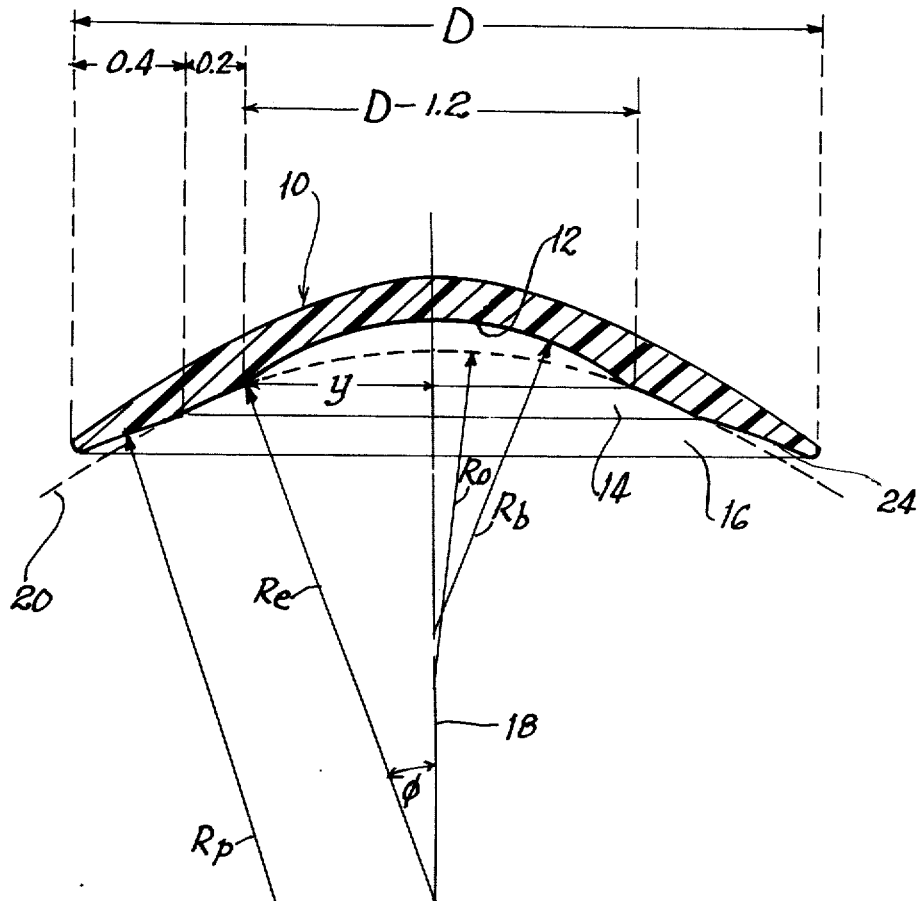

United States Patent
Townsley

[11] 3,937,566
[45] Feb. 10, 1976

[54] PROCESS FOR PRODUCING CONTACT LENSES

[75] Inventor: Malcolm G. Townsley, Park Ridge, Ill.

[73] Assignee: Wesley-Jessen Inc., Chicago, Ill.

[22] Filed: Feb. 27, 1974

[21] Appl. No.: 446,399

Related U.S. Application Data

[63] Continuation of Ser. No. 232,040, March 6, 1972, abandoned, which is a continuation of Ser. No. 3,945, Jan. 19, 1970, abandoned.

[52] U.S. Cl. .................. 351/40; 351/160; 351/177
[51] Int. Cl.² ........................................ G02C 7/04
[58] Field of Search ..................... 351/160, 40, 177

[56] References Cited
UNITED STATES PATENTS

| | | | |
|---|---|---|---|
| 2,809,556 | 10/1957 | Hornstein | 351/160 |
| 3,227,507 | 1/1966 | Feinbloom | 351/160 |

OTHER PUBLICATIONS

Goldberg, Article in *Optometric Weekly*, Vol. 60, No. 7, Feb. 13, 1969, pp. 31–38.
Jessop, Article in *Contacto*, Vol. 5, No. 10, Oct. 1961, pp. 325, 326, 329, 330 & 332.
Jessop, Article in *Contacto*, Vol. 9, No. 1, March 1965, pp. 10-13.
Bier, Article in *Journal of the American Optometric Assoc.*, Vol. 28, No. 7, Feb. 1967, pp. 394–396.
Reynolds, Article in *Contacto*, Vol. 3, No. 3, March 1959, pp. 53–59.
Isen, Article in *Optometric Weekly*, Vol. 50, No. 52, Dec. 31, 1959, pp. 2581 & 2582.
Hamilton, Article in *Contacto*, June 1965, pp. 33 & 34 cited.
Mandell, Article in *Am. J. of Optometry & Archives*, Dec. 1965, pp. 742–747.
Townsley, Article in *Contacto*, Dec. 1967, pp. 72–81.

*Primary Examiner*—David H. Rubin
*Attorney, Agent, or Firm*—Pennie & Edmonds

[57] ABSTRACT

A process for prescribing and manufacturing contact lenses wherein a first concave curvature is developed on the interior face of the lens in the central optical zone. This concave curvature conforms to a portion of a sphere having a radius equal to the radius of a base curve determined to be suitable for the particular patient. A second concave curvature is developed on the interior face of the lens to provide a bearing zone in surrounding relationship relative to the optical zone. The second curvature conforms to an annulus of a sphere having a radius determined by the slope of the patient's eye at points of contact of the second curvature with the eye. The slope is determined by calculating the eccentricity of the ellipsoidal surface which most closely describes the shape of the patient's eye.

3 Claims, 2 Drawing Figures

PROCESS FOR PRODUCING CONTACT LENSES

This is a continuation of application Ser. No. 232,040 filed Mar. 6, 1972, which is a continuation of application Ser. No. 3,945, filed Jan. 19, 1970, both applications now abandoned.

This invention relates to a process for fitting contact lenses. The invention is particularly concerned with steps involved in the examination of a patient during which a proper prescription for the patient is determined and also the steps involved in the manufacture of the lens whereby a proper fit compatible with the prescription can be achieved.

In prescribing a contact lens, the physical structure of the lens must be considered in addition to the optical characteristics. Thus, a patient must have a lens which can be comfortably worn in addition to having a lens which provides the optical correction required by the patient.

Various analyses have been made of eyes with a view toward determining the most suitable lens designs from the standpoint of fit and comfortable wear. Although the studies have been made with the primary purpose of developing techniques which will provide lenses most comfortable for the patient, practical manufacturing techniques have also been a primary concern. Thus, economies and efficiencies in the production of lenses are important in order to provide lenses which will be available to anyone needing or desiring contact lenses.

Prior investigations have resolved that the contour of the exterior surface of the cornea is essentially elliptical. Reports to this effect are found in Feinbloom U.S. Pat. Nos. 3,227,507, issued Jan. 4, 1966, and 3,283,446, issued Nov. 8, 1966. An additional report in this area is found in the article entitled "New Equipment And Methods For Determining The Contour Of The Human Cornea" by Malcolm G. Townsley, published in the December 1967 issue of "Contacto", pages 72–81. These articles essentially indicate that the cornea, on any given meridian, can be described by a section of an ellipse. In most eyes, the ellipses differ in the several meridians, so that the corneal shape is, as described by Feinbloom, a toric ellipsoid or an elliptical toroid.

Although these studies are quite useful from the standpoint of understanding the structure of the eye, there has not been provided a satisfactory method for prescribing and manufacturing lenses which will combine comfortable wear with practical manufacturing techniques.

It is a general object of this invention to provide an improved process for the prescribing and manufacturing of contact lenses.

It is a more specific object of this invention to provide a process for the prescribing and manufacturing of contact lenses wherein the steps for prescribing a lens can be followed with relative ease by practitioners and which calls for manufacturing steps which can be carried out in a practical fashion.

Figure 2:
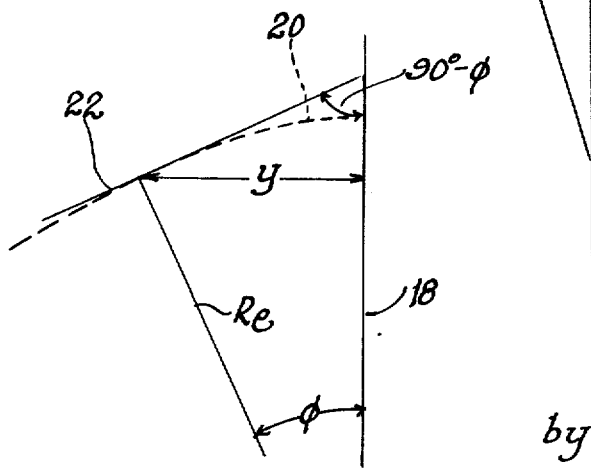

These and other objects of this invention will appear hereinafter, and for purposes of illustration, but not of limitation, specific embodiments of the invention are shown in the accompanying drawing in which:

FIG. 1 comprises a cross-sectional view of a contact lens produced in accordance with the techniques of this invention; and, FIG. 2 is a detail view illustrating an elliptical contour and slope used in making determinations in accordance with this invention.

The process of this invention calls for the production of a contact lens which essentially includes a central optical zone and a surrounding bearing zone. The process includes as an initial step the determination of a suitable base curve for the lens which may involve any one of several accepted techniques. The lens is then provided with a first concave curvature on its interior face, this curvature covering the optical zone and conforming to a portion of a sphere having a radius equal to the base curve radius.

The process of this invention also involves a determination of the eccentricity, e, of the eye according to the formula:

$$e = \sqrt{1 - \frac{b^2}{a^2}}$$

where $b$ and $a$ are, respectively, the minor and major semi-axes of an ellipse formed on one meridian extending over the cornea in the area to be covered by the optical zone of the lens. When the eccentricity has been determined, then the slope of the ellipse in the area to be covered by the bearing zone of the lens is determined. A second concave curvature is then formed on the interior face of the lens based on this slope.

The lens first comes into contact with the cornea at the junction of the bearing zone and the optical zone, and the diameter of this junction (the chart of the circle which is formed by the function), is called the bearing diameter.

The second concave curvature conforms to an annulus of a sphere having a radius, $R_e$, according to the formula $$R_e = \frac{y}{\sin \phi}$$

where $\phi$ is the complement of the slope of the corneal curve at the desired bearing zone diameter and $y$ is the semichord of the bearing zone, that is, one-half the bearing diameter.

It is desirable to provide a peripheral portion in contact lenses which will facilitate tear-flow when the lens is on the eye. This is best accomplished by providing a peripheral curve conforming to an annulus of a sphere having a radius substantially greater than the radius employed in producing the bearing zone whereby the periphery of the lens will depart from the corneal surface. The presence of a gap in this peripheral area tends to produce a pumping action which provides desirable tear-flow. The precise peripheral curve which will produce the most beneficial results can also be determined by the data which is developed in the course of producing the optical and bearing zones of the lens.

The drawing illustrates a contact lens 10 which has been developed in accordance with the techniques of this invention. This lens defines a centrally located optical zone 12, an annular bearing zone 14 and a second annular zone 16 comprising the peripheral portion of the lens.

The optical zone 12 consists of a portion of a sphere having a radius $R_b$. This radius is generated from a point on the line 18 which extends through the apex of the lens and which, therefore, defines the central axis of the lens.

The bearing zone 14 consists of a portion of a sphere corresponding with the annulus of a sphere having a radius $R_e$. The peripheral zone 16 also conforms to the annulus of the sphere, the sphere in this case having a radius $R_p$. The dotted line 20 is intended to illustrate the elliptical curvature of one meridian of the cornea. The areas 12, 14 and 16 are illustrated as having sharply defined junctures. In practice, blending operations will be undertaken to smooth and round these junctures; and the illustration is provided primarily to best demonstrate the characteristics of the invention.

In carrying out the process of the invention, the radius $R_b$ is first determined. The length of this radius is selected to provide a clearance between the corneal curve and the lens within the optical zone. A typical clearance is approximately 0.025 mm at the center of the cornea. To select $R_b$, the constants of the ellipse which most closely represents the corneal curve through the flattest meridian are determined, preferably by photokeratometry as described in the aforementioned Townsley article where techniques for determining the contour of the cornea are described. The best fitting ellipse to the contour found as described is determined by mathematical techniques well known in the mathematical art. From the constants of the ellipse the saggital dimension from the apex to the bearing diameter is found, and the radius $R_b$ is the radius of the circle which will contact the ellipse at the bearing diameter and have a central height equal to the saggital dimension plus the desired apical clearance.

Data compiled over the years has also led to the development of charts which can be used for determining the base curve radius. Reference is made to size charts and Nomogram charts prepared and published by The Plastic Contact Lens Company which may be used for this purpose. A base curve can be determined with these charts by securing para-central readings with a keratometer in accordance with known techniques. These readings, which are preferably taken on the flattest meridian, are averaged, and when this average reading is located on a Nomogram chart or the like, a base curve radius can be determined. This radius automatically takes into consideration the desired apical clearance.

To determine the over-all lens diameter, the practitioner determines the size of the patient's cornea and then takes a central K measurement by means of well-known keratometer techniques. The chart then provides the practitioner with the desired over-all lens diameter D for a patient.

The following tables illustrate a small portion of a Nomogram chart and a size chart. If the practitioner determines that the patient has a cornea with a diameter of 12 mm and a central K radius of 38.00, then a lens diameter D of 7.8 is best suited for this patient. If the para-central readings average 37.5, then the Nomogram reveals that a base curve radius of 8.57 should be used.

SIZE CHART

| Size of Cornea in mm | Central "K" 35.00 | 36.00 | Flattest Meridian 37.00 | 38.00 | 39.00 |
|---|---|---|---|---|---|
| 12.4 | 8.0 | 8.0 | 8.1 | 8.1 | 8.1 |
| 12.2 | 7.9 | 7.9 | 7.9 | 7.9 | 8.0 |
| 12.0 | 7.7 | 7.8 | 7.8 | 7.8 | 7.8 |

NOMOGRAM
For Base Curve Determinations

| Para-central Reading Diopters | Size 7.6 | 7.8 Base Curves mm | 8.0 | 8.2 |
|---|---|---|---|---|
| 37.00 | 8.67 | 8.68 | 8.70 | 8.72 |
|  | 8.61 | 8.62 | 8.64 | 8.66 |
| 37.50 | 8.56 | 8.57 | 8.59 | 8.61 |

Lenses process in accordance with this invention may originate from lens blanks of a conventional type manufactured for example of a plastic such as methyl methacrylate. When the base curve has been determined, a concave curvature is formed on the interior surface of the blank. As shown in the drawing, this curvature 12 corresponds with a portion of a sphere having a radius $R_b$. The surrounding bearing zone 14 usually has a width between about 0.1 and 0.3 mm and preferably of about 0.2 mm, and the peripheral zone 16 usually has a width between about 0.25 and 0.5 mm and preferably about 0.4 mm. Accordingly, if the desired over-all diameter D is found to be 7.8 mm, then the diameter of the optical zone 12 will be 6.6 mm (D-1.2 mm).

Knowing the desired size of the bearing zone 14 and the diameter of the optical zone, the length of the semi-chord y can be determined. This length is preferably measured from the intersection of the bearing zone, and the optical zone and, therefore, in the example given, the distance y will be 3.3 mm.

FIG. 2 illustrates a line 22 defining the slope s of the curve 20 at the point of intersection of this curve with the semi-chord y. The radius $R_e$ comprises the distance along a line extending perpendicular to the line 22 to its intersection with the axis line 18. The angle $\phi$ constitutes the angle included between $R_e$ and the axis 18. This relationship can, of course, be plotted where a photokeratometer reader is used for displaying the eye curvature as set forth in the aforementioned article.

The constants of the ellipse most easily computed are the major axis and the minor axis. From these, all the other ellipse constants can be found by applying the standard equations for the ellipse.

It is most convenient to use the equations in a specific form, if a is the major axis and b the minor axis, $$e = \sqrt{1 - \frac{b^2}{a^2}}$$

$$q = \frac{b^2}{a} = 1 - e^2$$

$$x^2 - 2ax = \frac{y^2}{q} = 0$$

It can also be derived that:
$$R_o = -a\,q$$

The values for $R_o$, the radius of curvature at the pole of the cornea, and $q$ can be found either from the fitting of the ellipse to the known data points as described above, or by the use of visual keratometry and the computations outlined in the Feinbloom patents. It is known that the slope of the ellipse which represents the corneal curve varies with the distance from the vertex according to the equation:

$$\frac{dy}{dx} = (a - x)\frac{q}{y}$$

$$s = \frac{dy}{dx}$$

The value of the slope for any $y$ can be found by solving the basic ellipse equation to find the corresponding $x$, and substituting into the equation for the slope, or by substituting the algebraic value for $x$ into the equation for the slope, which then becomes:

$$s = \frac{R_c^2 - y^2 q}{y}$$

or $$s = \frac{a^2 q^2 - y^2 q}{y}$$

With the known slope and the value of $y$, the radius of a circle can be found which will have the given slope at the given value of $y$, by using the following relationships:

$$\tan \phi = \frac{1}{s} \qquad R_c = \frac{y}{\sin \phi}$$

When the value $R_c$ is known, the annulus 14 can be developed on the interior face of the lens. Tools used for forming desired curvatures on the lens surfaces are available. The calculations described are thus made for the purpose of determining the most suitable configuration for a particular patient and once this determination is made, the technology for actually producing the lens does not present any significant problem.

As indicated, the data required for producing the lens can be plotted from a photograph of a target reflected in the cornea with a photokeratometer. The detailed constants of the ellipse are determined in the course of the computations which analyze the measurements of the photograph. The slope of the curve at the selected bearing diameter ($2y$) is computed and the radius of the circle most nearly parallel to the ellipse at this point is then provided. The annulus comprising the bearing zone thus has an interior surface best suited for the specific eye being fitted.

In cases where a photokeratometer is not available as, for example, when a lens is being fitted from a keratometer measuring indicated vertex radius, an estimate of the eccentricity of the cornea provides the best approach. Measurements made on a large number of eyes have established that the average eccentricity $e$ is 0.6. It will be apparent that using this value for $e$, and knowing the vertex radius and bearing diameter, the slope can be calculated.

If a keratometer is used for calculating paracentral radii, a more accurate estimate of the eccentricity is available. Thus, the value 0.6 is only employed where equipment limitations require this.

Whatever method is employed for determining the slope, it is most desirable to base the determinations on the flattest meridian of the cornea. The determinations are then used for making a lens which is symmetrical over-all of the interior face. The concepts of the invention are, however, applicable where a lens is being fit to a particularly toric eye. In this case, a separate set of curves may be developed on a second meridian to provide a more suitable fit. The calculation method for the separate curvatures should, however, be identical with the calculations described relative to the flattest meridian.

The peripheral curve 16 is also determined on the basis of the eccentric shape of the cornea. Where a plot of the elliptical curve is available, then a radius $R_p$ can be readily determined by choosing a desired value for the spacing 24 between the peripheral edge of the lens and the cornea. A circle having a radius which will generate a curve through these spaced points and also through the intersection of the bearing zone 14 and peripheral zone 16 is then selected. In a typical case, the spacing 24 equals 0.06 mm. Since this spacing may be considered a constant for virtually all eyes, the value $R_p$ can be included in data which is received from a computer along with the other values referred to. By a series of calculations, the radius $R_p$ can be determined for various values of $R_b$ and $R_c$ and, therefore, tables can also be used for developing the value $R_p$.

It will be understood that various changes and modifications may be made in the above described process without departing from the spirit of this invention.

That which is claimed is:

1. A method of making a contact lens for the eye of a patient, said lens defining an optical zone and a surrounding bearing zone, comprising the steps of; measuring the eye of said patient to obtain a base curve and the slope of the cornea of the eye at at least one point in the area to be covered by said bearing zone of said lens, forming a first concave curvature on the interior face of said lens, said first curvature conforming to a portion of a sphere having a radius equal to the radius of said base curve, and forming a second concave curvature on the interior face of said lens to provide a bearing zone, said second curvature corresponding to the annulus of a sphere having a chord equal to the diameter of said optical zone and having a slope at the point of intersection of said chord and said annulus conforming to said measured slope.

2. A method of making a contact lens for the eye of a patient, said lens defining an optical zone and a surrounding bearing zone, comprising the steps of; measuring the eye of said patient to obtain a base curve and the slope of the cornea of said eye at at least one point in the area to be covered by said bearing zone of said lens, forming a first concave curvature on the interior face of said lens, said first concave curvature conforming to a portion of a sphere having a radius equal to the radius of said base curve, and forming a second concave curvature on the interior face of said lens to provide said bearing zone, said second curvature conforming to an annulus of a sphere having a radius, $R_r$, according to the formula:

$$R_r = \frac{y}{\sin \phi}$$

wherein $y$ is the semi-chord extending from the central axis of the lens to the point at which the corneal slope is determined and $\phi$ is the complement of the angle between the tangent to the corneal curve at said point and said central axis.

3. The method of claim 2 further comprising the step of forming a third concave curvature on the interior base of said lens to provide a peripheral zone, said third curvature conforming to a sphere passing through the two points defining the inner boundary of the peripheral zone to create an annular wedge-shaped ring between the peripheral zone and the cornea.

* * * * *

UNITED STATES PATENT AND TRADEMARK OFFICE
CERTIFICATE OF CORRECTION

PATENT NO. : 3,937,566
DATED : February 10, 1976
INVENTOR(S) : Malcolm G. Townsley It is certified that error appears in the above–identified patent and that said Letters Patent are hereby corrected as shown below:

Col. 2, line 33, "chart" should be --chord--;
Line 34, "function" should be --junction--;

Col. 3, line 38, "represents" should be --represent--;
Line 46, "saggital" should be --sagittal--;
Line 49, "saggital" should be --sagittal--;

Col. 4, line 28, "process" should be --processed--;
Line 66, the formula should be:
$$q = \frac{b^2}{a^2} = 1-e^2$$

Line 62, "major" should be --semi-major--; same line, "minor" should be --semi-minor--.

Signed and Sealed this

Fourteenth Day of September 1976

[SEAL]

Attest:

RUTH C. MASON
*Attesting Officer*

C. MARSHALL DANN
*Commissioner of Patents and Trademarks*